United States Patent [19]

Sandmeier

[11] 3,762,808
[45] Oct. 2, 1973

[54] DATA REPRODUCTION APPARATUS

[76] Inventor: Arthur Sandmeier, 78 Chemin de la Caille, Neuchatel, Switzerland

[22] Filed: May 17, 1971

[21] Appl. No.: 144,001

[30] Foreign Application Priority Data
May 22, 1970 Great Britain.................. 24,909/70

[52] U.S. Cl...................... 353/27, 353/67, 353/108
[51] Int. Cl....................... G03b 23/10, G03b 21/06
[58] Field of Search .................. 353/25, 26, 27, 74, 353/75, 76, 77, 78; 74/10.5, 10.54, 10.7; 177/172, 37, 39

[56] References Cited
UNITED STATES PATENTS
| | | |
|---|---|---|
| 3,117,491 | 1/1964 | Stern...................................... 353/25 |
| 2,606,239 | 8/1957 | Beste .................................. 74/10.7 |
| 2,296,141 | 9/1942 | Brown.................................. 353/25 |
| 2,767,610 | 10/1956 | Hintz .................................. 353/27 |

FOREIGN PATENTS OR APPLICATIONS
867,758 2/1953 Germany .............................. 353/27

Primary Examiner—Louis R. Prince
Assistant Examiner—A. J. Mirabito
Attorney—Bauer & Amer

[57] ABSTRACT

A film projector having its own screen and an enclosed optical system for projecting images from a predetermined area onto the screen. A cylinder is provided onto whose surface a strip of microfilm having information images is mounted. A desired information image is brought to a predetermined area for projection by said optical system by rotating and/or axially moving the cylinder. The rotation and/or axial movement is achieved with pulley systems coupled to dials which are available to the operator of the projector.

13 Claims, 8 Drawing Figures

PATENTED OCT 2 1973 3,762,808

INVENTOR.
ARTHUR SANDMEIR

BY *Bauer & Amer*

ATTORNEYS

INVENTOR.
ARTHUR SANDMEIER

BY

ATTORNEYS

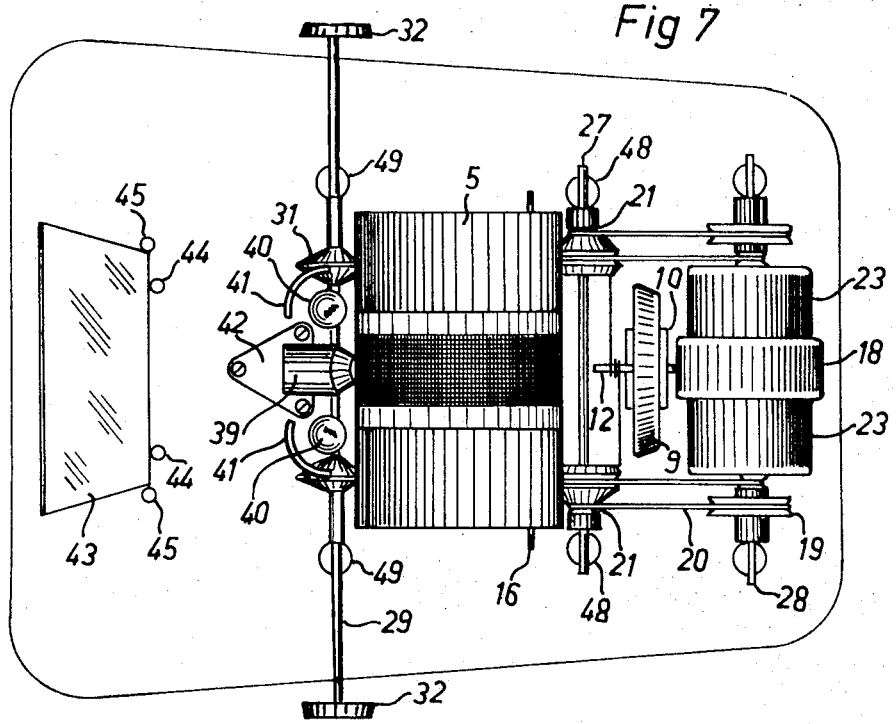

DATA REPRODUCTION APPARATUS

The present invention relates to a device for reproducing selected information stored on film, paper, or the like.

In the following reference is made to microfilm, although it is to be understood that the term includes photographic paper, printed sheets, and any other similar material on which visual data may be stored.

Until recently the faithful reproduction of data stored on microfilm did not present any problem. The microfilm was of sufficiently large size and the data of such typed or graphic form that it was easily read even if a certain degree of distortion did occur in the system. However, recently the size of microfilm and data storage means have been drastically reduced and more and more complex information has been stored on it so that distortions are no longer tolerable.

Heretofore, devices for achieving so-called high fidelity reproduction of information stored on microfilm employed an optical scanner mounted on a carriage capable of being moved or being translated accurately along two planar coordinates. Moreover, in order to maintain good focusing of projected images, the film had to be held between glass plates in order to provide the fixed planar position by which distortion of the film is eliminated.

The above-mentioned "planar" requirements have only been achieved with precise and expensive mechanisms, as a result of which the cost factor has placed a serious limitation on the availability of high magnification reproducing systems.

The planar movement of the scanner carriage and/or the film strip also prevented the design and production of reproduction apparatus of high speed and efficiency and/or the use of a variety of sheet material other than the conventional microfilm.

It is, accordingly, the object of the present invention to provide a data reproduction device overcoming the defects of the prior art.

It is an object of the present invention to provide a data reproduction device which has greater fidelity of reproduced image and speedier and easier operation.

It is another object of this invention to provide a data reproduction device having high magnification and substantial data storage capacity.

It is another object of this invention to provide a data reproduction device having a low distortion optical system.

It is another object of this invention to provide a data reproduction device having a mounting for film having images which minimized buckling and distortion of images projected therefrom.

These objects, others, as well as numerous advantages will be obvious from the following disclosure of the invention.

According to the present invention, data reproduction method and apparatus is provided in which the information image is stored on a multi-image strip of film, paper or the like, and which comprises a screen and an optical system for projecting the data to the screen. The strip is formed into a cylinder located in front of the optical means and rotated and shifted relative to its axis until a predetermined image is selected for viewing.

In the preferred form of the invention, the strip is arranged with discrete frames of information images in columns and rows capable of easy selection. The strip is located over a cylinder and bent in one direction only, preferably along the long axis. The cylinder is fully supported in a rotating cradle for frictional drive, and is provided with manual control means by which it may be rotated and shifted without relative movement of the film with respect to the cylinder.

The optical system includes an objective lens, a source of light and a mirror for transmitting the image to the screen. The lens is fixed to avoid damage and distortion and the mirror is adjustably mounted to compensate for distortion.

Full details of the present invention are set forth in the following description and will be seen in the accompanying drawings.

BRIEF DESCRIPTION OF DRAWINGS

In the accompanying drawings:

FIG. 7 is a modified sectional view of the device according to the invention; and FIG. 8 is a partial plan view of a second embodiment according to the invention.

Figure 1:
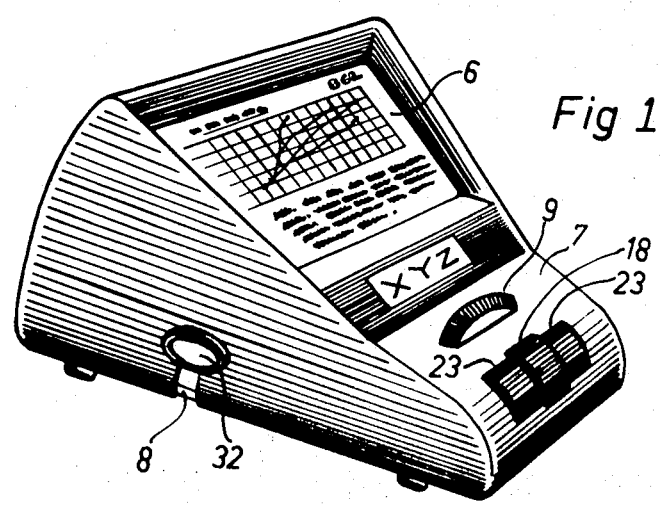
FIG. 1 is a perspective view of the data reproduction device according to the invention.

A general view of the device according to the present invention is shown in FIG. 1. The device comprises an enclosure which includes a base 8, and a removable cover 7 having a plurality of apertures through which control dials 18, 23 and 9 project. A shaft 29 (seen in FIG. 4) projects from both sides the cover 7 and is provided with a knob 32 at each end. The cover 7 has a slot below the shaft 29 to permit its removal. A screen 6 onto which images are to be projected is built onto the upper face of the cover 7. The enclosure is designed in a pleasing compact arrangement forming an operating console combining the control means as well as the viewing means. The cover 7 is snap fit over the base 8 and both are provided with mating clip means, detents, and projections of conventional type to provide for the easy removal of the cover yet its fast and secure hold on the base during use.

Figure 2:
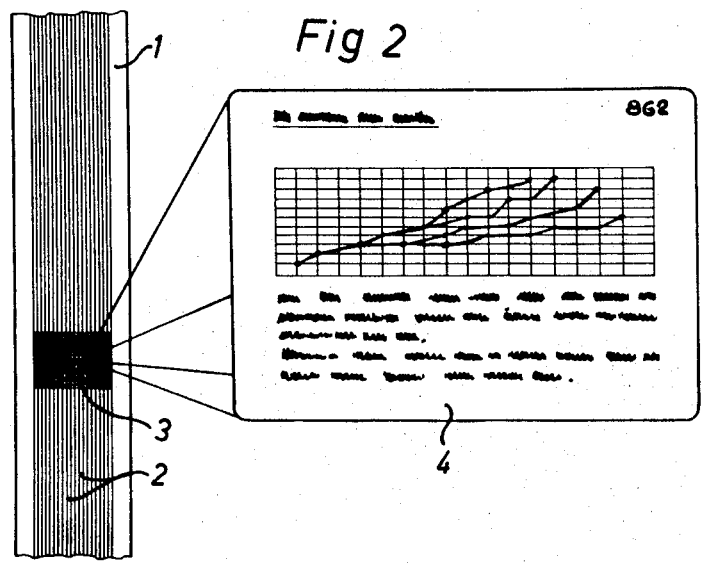
FIG. 2 is a plan view of a strip of microfilm and an exploded view of information located thereon.
Figure 6:
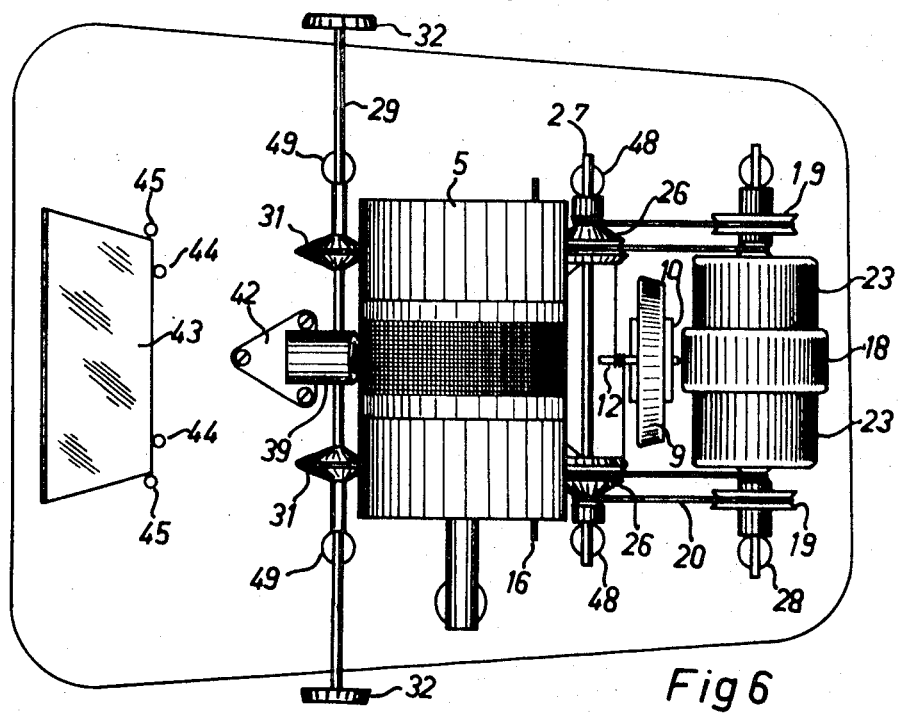
FIG. 6 is a plan view of a partially assembled device according to the invention.

The present device preferably employs multi-image transparent sheet or data storage material such as a microfilm strip 1 (FIG. 2), the pieces of information being actually stored in a plurality of frames 4 arranged in a series of columns 2 and rows 3. The columns 2 being parallel to, while rows 3 being transverse to, the longitudinal axis. Each frame 4 is of such dimension that it contains a unitary body of data such as a chart, picture, printed page which can be projected as a whole onto the screen. The film strip 1 is formed and shaped into a cylinder and is supported in the device on a rotatable and axially translatable light transmitting cylinder 5, which can be removed for this purpose from the enclosure on removal of the cover 7. The film is wound about the circumference of the cylinder substantially at its axial center as seen in FIG. 6 to form a continuous belt or girdle thereabout. To this end the cylinder may be provided with a slot 5a (FIG. 8) in which the end of the strip 1 may be inserted. Fastening means, such as clips, hooks or screws, may also be provided to conveniently hold the strip on the cylinder. It may even be preferred that the ends of the strip 1 be secured together as by gluing, heat, etc. to provide an endless circular belt of approximately the same diameter as the cylinder 5 so that it can be slided thereover and securely held thereon. The strip and cylinder may also be provided with mating holes and sprockets in a more usual construction and thus held thereon by rollers or pressure sprockets.

Figure 4:
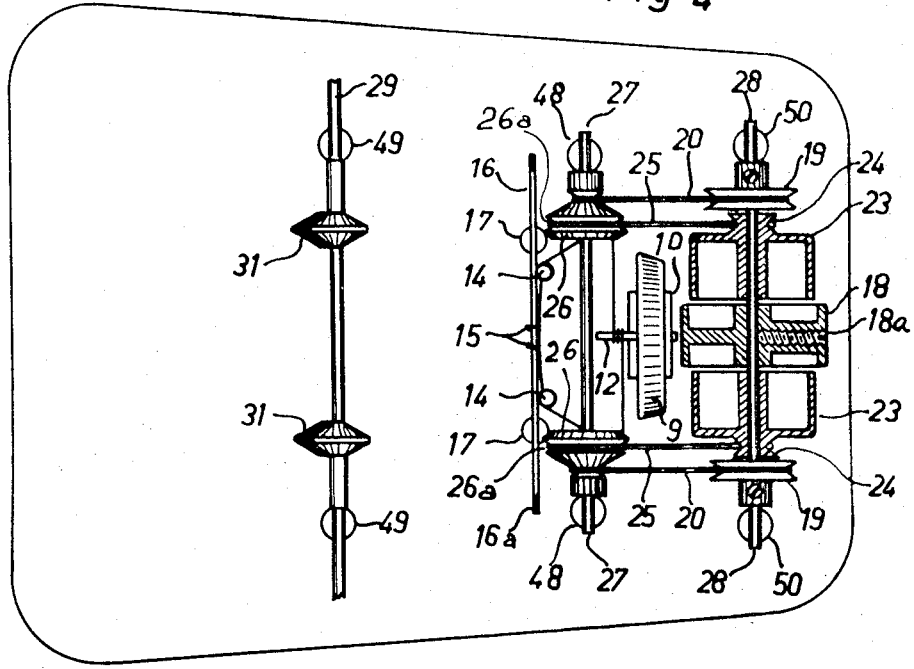
FIG. 4 is a plan view of a further part of the operating mechanism according to the invention.

As seen in FIGS. 4 and 8, the cylinder 5 is supported by its own weight on two pairs of friction rollers 26 and supporting rollers 31. The rollers 26 are fixedly mounted on a shaft 27, while rollers 31 are fixed on a parallel shaft 29 which, it will be recalled, extends outwardly of the cover 7. Shafts 27 and 29 are journalled on bearing supports 48 and 49, respectively, fixed to the base 8.

The cylinder 5 is rotated via the control dials 18 and 23. The central control dial 18 is held by set screw 18a so it is fixed fast to rotate an elongated shaft 28 rotatably journalled on posts 50 secured to the base 8. Also fixed to and for rotation by the shaft 28 at the outer ends thereof are large pulleys 19 about each of which belts 20 are entrained. The belts 20, each pass over a smaller pulley 21 respectively fixed to the shaft 27 on which roller 26 are fixed. Both control dials 23 are freely rotatable about the shaft 28 and thus relatively to the dial 18 and each dial carries a pulley 24 that rotates with its respective dial on one side thereof. The pulleys 24 are small and each has a looped belt 25 entrained over it. The belts 25 loop over the roller 26, the rims of which being grooved at 26a to accommodate the diameter of the belt 25.

It will be noted that the relative size of the associated pulleys 19 and 21, and the relative size of the pulley 24 and roller 26 are inverted with respect to each other. The dimensions of each are so chosen and predetermined that the rotation of control dial 18 causes the cylinder 5 to be rapidly turned about its axis whereas rotation of dials 23 causes the cylinder 5 to rotate at a substantially lower speed.

Figure 3:
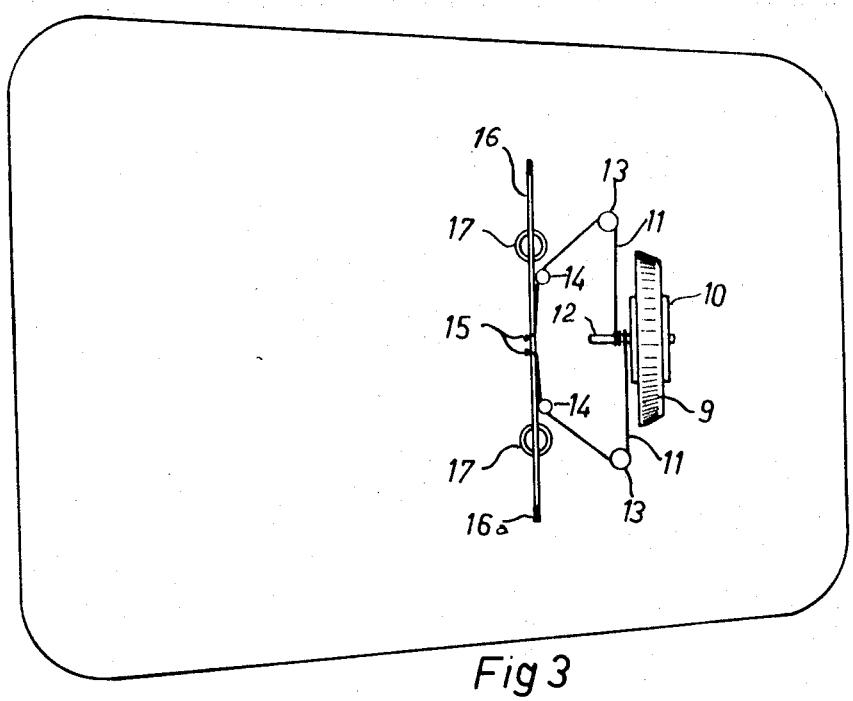
FIG. 3 is a plan view of a part of the operating mechanism of the device according to the invention.

Dial 9 is used to control the lateral displacement of the cylinder 5. As shown in FIGS. 3 and 8, a vertical bracket 10 coupled to the base 8 supports a horizontal shaft 12 which serves as a pulley and as an axis about which dial 9 is connected. A fork shaped bracket 16 is slidably mounted in supports 17 which, in this example, are an integral part of the frame 8.

The forked bracket 16 has short vertical tabs 16a at each end of which are adapted to engage the ends of the cylinder 5 as it rotates.

A cable 11 runs over the axle 12 and around idlers 13, 14 arranged in a trapezoid array. The cable 12 has its ends 15 secured to the center of the fork 16 so that a turning of dial 9 results in a lateral movement or translation of the fork 16 and the cylinder 5 which is engaged by the tabs 16a.

Figure 5:
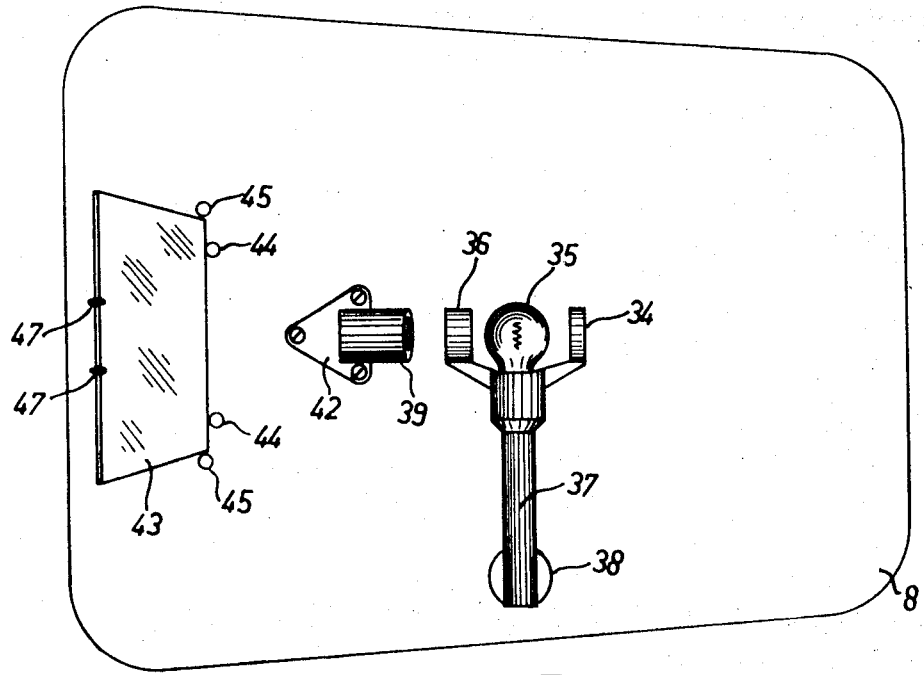
FIG. 5 is a plan view of a part of the optical system according to the invention.

By selectively moving the control dials 9, 18, and 23 the cylinder 5 may be rotated and/or laterally shifted so that any one of the frames 4 on the strip 1 may be selected for viewing. When a piece of information or frame is selected from the microfilm, it is projected onto a screen 6 by an optical system shown in detail in FIG. 5 as well as the other Figures. The system comprises an arm 37 supported by a post 38 on the base 8. The arm 37 extends cantilever fashion into the cylinder 5 (when placed in the device) and supports therein a bulb 35, a reflector 34, and a condenser lens 36. The cantilever support allows removal of the cylinder 5. An objective lens 39 is secured to the base by a bracket 42 in line with the condenser 36. The condenser 36 and objective lens 39 are aligned along the vertical plane through which the central longitudinal axis of the device is located so that the same is substantially arranged at the axial center of the cylinder 5. Mounted with the enclosure, behind the objective lens 39, is a coated mirror 43 reflecting the image to the screen 6.

The coated mirror is mounted on base 8 by a plurality of studs 44 in front of it, studs 45 to the side and a post 46 at its rear. A pair of laterally spaced springs 47 secures the mirror 43 in place with respect to the base. This method of mounting the mirror has a number of advantages. First, the mirror is supported effectively on only three points, the two front studs 44 and the rear post 46. Secondly, the springs 47 can be located and provided with relative spring rates so that adequate force or tension is placed on the mirror. Thus, the mirror can be perfectly positioned in order to reflect the image directly to the screen without distortion. The mirror is not glued, or permanently fastened, to the enclosure; therefore, constant adjustment can be made and distortions of construction avoided. The mounting also permits less expensive mirrors to be used since adjustment is always possible. While the mirror is not rigidly fixed to the enclosure, it does, however, remain perfectly located during operation.

The location of the selected frame 4, by rotation and translation of cylinder 5 before the eye of the objective lens 39, is all that is necessary to project an image on the screen 6. The light from the interior of the cylinder 5 casts an image through the objective lens 39 onto the mirror 43 which is thus reflected on the screen 6. As seen in FIG. 8, the reflector 34, condenser lens 36, and objective lens 39 are arranged along an axis offset or angular to the horizontal, although within the same vertical plane. The axis tilts downwardly toward the rear of the enclosure while the mirror 43 is tilted upwardly at an angle of incidence which provides for the proper distortionfree enlargement of the image on the screen 6. The screen 6 is likewise at an angle which will provide easy viewing to the operator.

To provide for fine adjustment of the focus the circular rollers 31, although not so shown in the drawings, are in fact eccentrically mounted on the shaft 29 so that the distance between the objective lens 39 and the cylinder 5 caused by the rotation of the rollers 31 may be varied. Rotation of the knob 32 causes rotation of the eccentrically mounted rollers 31 and simultaneous displacement of the axis of the cylinder 5 with the resultant displacement of the frame 4 relative to the optical system and in particular the objective lens 39. This varies the distance between the cylinder and the objective lens to bring the image on the film strip closer or farther away from the optics.

Preferably the point of bearing of the cylinder on the eccentric rollers 31 should be chosen to ideally coincide with the axis of the optical system. However, due to physical limitations, this cannot be accomplished. However, the shaft 29 and rollers 31 should be arranged as near to this ideal as possible. To maintain a straight shaft and 360° rotation, the shaft is slightly below the objective lens 39.

The cover 7 includes a spring 33 as shown in FIG. 8 which, when the device is assembled, exerts pressure on the cylinder 5. The pressure increases the frictional drive extended by the weight of cylinder on the rollers 36 and 31 and holds the cylinder 5 in place while the device is carried or shipped.

In a variant, as shown in FIG. 7, the device is substantially similar to that first hereinabove described. The light source, however, is not located within the cylinder 5 but instead comprises a pair of bulbs 40, arcuate reflector 41, located symmetrically about the objective lens 39 exteriorly thereof.

In this embodiment, the image is not directly transmitted to the objective lens 39 but is reflected or picked up by the objective. In this embodiment, the cylinder 5 may be opaque and the film strip 1 mounted thereon or the film information may be etched directly on the cylinder that may be of glass. In any event, the cylinder remains easily removable.

It will be seen from the foregoing that a simple inexpensive data reproducing device has been achieved suitable for use with microfilm, printed opaque sheets, and a variety of other data storage means. The film or sheet material is held without the use of complex plates, guides, or similar equipment. Furthermore, the objective lens itself is fixed and does not require means for moving it at all. It will also be observed that once the film strip is placed on the cylinder, it itself is not thereafter moved or touched. The cylinder is rotated and shifted without disturbing the film or changing its relative position. The film is bent in only one plane, preferably along its long axis, and maintained exactly in that plane at all times. The film thus is bent along only one axis determined by the radius of the cylinder 5. It maintains a straight line along its other axis. The area of the frame 4 thus selected for projection can easily be maintained at fixed and desired focal distance relative to the objective lens 39. Distortions caused by movement of the film, scanning along two axes, buckling of the film, bending of the film along two axes amongst other disadvantages are all eliminated, and a more practical and efficient magnification is obtained.

The device is easy to use since the cover is easily removable and the film strips are easily replaceable on the cylinder. Operation of the control dials 9, 18, and 23 are also simple.

The above described device is a portable desk top instrument of compact size and light weight, providing a prerecorded visual information storage of substantial capacity with rapid and easily operable retrieval capability for the stored information which is magnified and projected onto a screen for convenient reading.

The ratio of photographic reduction used can vary from 10:1 to 300:1 depending on the amount of information to be stored, the overall dimensions of the device and storage cylinder and the sophistication of the optical components.

The simplicity of construction of the device is conducive to low manufacturing costs.

The foregoing description of specific embodiments of the subject invention is submitted only to show examples of how the invention may be practiced and is not to be considered as a limitation on its scope. Various changes and modifications have been suggested, others will be obvious to those skilled in this art.

What is claimed is:

1. Apparatus for selectively reproducing a portion of the information image stored on a multi-image strip of film, paper, sheet or similar material, comprising an enclosure having means providing access therein, a screen forming a portion of said enclosure, optical means mounted in said enclosure for projecting said image on said screen, a cylinder on which said image strip is mounted, a cradle for freely supporting said cylinder in association with said optical means, comprising a pair of spaced parallel rotatable shafts each having roller means adapted to frictionally engage the periphery of said cylinder means for rotating at least one of said shafts to rotate said cylinder about its central axis parallel to the axis of said shafts and including control means extending out of said enclosure for manual operation and means operable from without said enclosure to be movable into slidable abutment with at least one end of said cylinder to cause lateral shifting of said cylinder with respect to said shafts to permit selection of a predetermined one of said image portions through said optical means.

2. The apparatus according to claim 1 wherein one of said shafts is provided with first and second pulley means of different diameter, and means coupling said pulley means to said control means whereby said shaft may be selectively rotated at different speeds.

3. The apparatus according to claim 2 wherein said control means comprise first and second coaxially arranged rotatable dials, each of said first and second dials having pulley means, and a connecting loop coupling said pulley means respectively to the first and second pulley means on said cylinder shaft.

4. The apparatus according to claim 2 wherein the rollers of said other shaft are eccentrically mounted with respect to said other shaft and a knob is secured at the end of said other shaft extending outwardly of said enclosure whereby on rotation of said knob the distance of said cylinder to the objective lens may be changed.

5. The apparatus according to claim 1 wherein said means for causing lateral shifting of said cylinder includes a forked member axially straddling said cylinder and supported within said enclosure to reciprocate parallel to the axis of said shafts, and a third dial journalled within said enclosure and extending outwardly therefrom, and means coupling said third dial and said forked member whereby said fork may be selectively moved to translate said cylinder along its central axis.

6. The apparatus according to claim 5 wherein said third dial is journalled to rotate about a horizontal axis substantially perpendicular to the axis of the cylinder, and includes pulley means mounted about the axis of rotation and a cable connecting said pulley to said forked member, and positioning means for running said cable so as to convert said rotation of said pulley into reciprocation of said forked member.

7. The apparatus according to claim 1 wherein said optical means includes an objective lens, light means and means for reflecting light from said strip onto said lens.

8. The apparatus according to claim 7 wherein said cylinder is transparent, said strip is transparent, and said light means includes a source of light located within said cylinder.

9. The apparatus according to claim 7 wherein said light means includes a source of light located exteriorly of said cylinder and said means for reflecting light comprises a condensing arcuate reflector.

10. The apparatus according to claim 7 including mirror means for reflecting said image from said objective lens onto said screen, said mirror and objective lens being positioned so as to magnify the image incident on said screen.

11. The apparatus according to claim 7 wherein said mirror is substantially planar, and is supported at an angle to the horizontal within said enclosure by restraining means secured to said bottom of enclosure along the corresponding edge of said mirror, and at least one spring coupled to the upper edge of said mirror and the bottom of said enclosure.

12. The apparatus according to claim 11 including at least a pair of springs spaced along the edge of said mirror, said springs being relatively adjustable to vary the rate thereof and thereby the position of said mirror.

13. The apparatus according to claim 1 wherein said enclosure comprise a base and a cover, said cover being removable from said base to provide access to said cylinder for exchange of the strips and said cylinder.

* * * * *